United States Patent [19]

Pfeiffer

[11] 4,258,374

[45] Mar. 24, 1981

[54] ELECTRICALLY OPERATED DEVICE FOR MARKING METAL-COATED PAPER

[75] Inventor: Horst Pfeiffer, Aldingen, Fed. Rep. of Germany

[73] Assignee: J. Hengstler K. G., Aldingen, Fed. Rep. of Germany

[21] Appl. No.: 79,314

[22] Filed: Sep. 27, 1979

[30] Foreign Application Priority Data

Oct. 21, 1978 [DE] Fed. Rep. of Germany ....... 2845977

[51] Int. Cl.[3] ............................................ G01D 15/08

[52] U.S. Cl. ................................ 346/163; 346/139 C

[58] Field of Search ........... 346/163, 162, 164, 139 C, 346/153, 155

[56] References Cited

U.S. PATENT DOCUMENTS

| | | | |
|---|---|---|---|
| 2,719,775 | 10/1955 | Erving, Jr. | 346/164 |
| 3,911,447 | 10/1975 | Ortlieb | 346/139 C |
| 3,997,903 | 12/1976 | Kelch et al. | 346/163 |
| 3,998,315 | 12/1976 | Phillips | 346/163 |
| 4,157,554 | 6/1979 | Bahr et al. | 346/163 |

*Primary Examiner*—Alfred H. Eddleman
*Attorney, Agent, or Firm*—Balogh, Osann, Kramer, Dvorak, Genova & Traub

[57] ABSTRACT

A frame carries a track. A voltage-applying circuit is carried by said frame and comprises a plurality of contact segments. An electrode holder is carried by said frame and in sliding contact with said track and movable relative to said circuit along said track between inoperative and operative positions. A plurality of leaf springs are carried by said electrode holder. Each of said leaf springs comprises a sliding contact portion protruding from said electrode holder and arranged to be in sliding contact with an associated one of said contact segments when said electrode holder is in said operative position. Each of said leaf springs comprises also a marking electrode portion protruding from said electrode holder and adapted to engage said metal coated paper when said electrode holder is in said operative position, and to be lifted from said paper when said electrode holder is in said inoperative position.

14 Claims, 4 Drawing Figures

ELECTRICALLY OPERATED DEVICE FOR MARKING METAL-COATED PAPER

Figure 3:
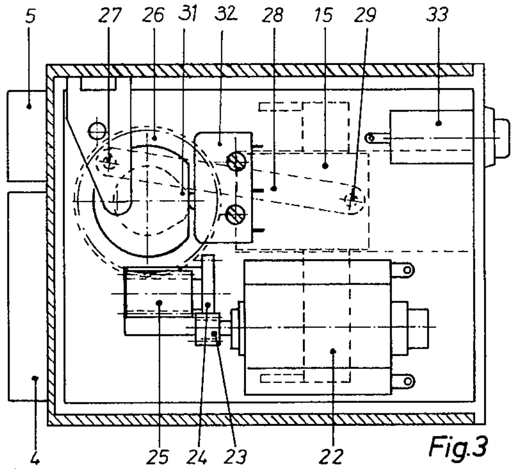

This invention relates to an electrically operated device for marking metal-coated paper particularly with large-area characters consisting of a plurality of segments.

Devices for marking record carriers having a metal coating which can be burnt off are known, e.g., from Opened German Specification 2,338,126 but that reference does not disclose device which can easily be manufactured but is only concerned with the mounting of the marking electrodes. Opened German Specification No. 2,411,498 describes a process in which comblike marking electrodes are employed and a special character generator is used to control each marking electrode so that only alternate electrodes are operated in succession. In this way, a formation of conducting bridges between the electrodes is avoided.

These and similar known marking devices have the disadvantage that an expensive control system is required, which is economical only in conjunction with expensive marking systems comprising a very large number of characters.

It is an object of the invention to provide such marking device which can be manufactured at lower cost than the known devices or the devices for carrying out the known marking methods and which does not require expensive control means for the selection of alphanumeric and similar characters. This is accomplished in accordance with the invention also in that a printed circuit is provided with contact segments corresponding to segments of characters with which the paper is to be marked and the printed circuit is directly associated with the marking electrodes.

To accomplish that object, an electrically operated device for marking metal-coated paper particularly with large-area characters consisting of a plurality of segments, is characterized in accordance with the invention in that leaf springs are provided, which are preferably angled and are mounted in an electrode holder and are guided and adapted to be lifted off and serve as marking electrodes and as sliding contacts, the latter cooperative with contact segments of a circuit, particularly a printed circuit, for feeding the marking voltage, and the electrode holder is adapted to be displaced parallel to the surface to be marked and to the printed circuit when the marking operation is to be performed.

Because marking electrodes provided with sliding contacts directly contact the printed circuit, the control circuit is much simpler than in the known arrangements. As the leaf springs move over the contact segments and the electrosensitive paper at the same time, marks corresponding to the segments to which the marking voltage is applied are directly formed on the electrosensitive paper. As a result, the otherwise existing need for a character generator and for means for controlling the application of the marking pulses to the marking electrodes is eliminated.

Particularly for special applications, such as the marking of the paper with large-area characters, the selection of the characters consisting in known manner of a plurality of segments in the marking device according to the invention can be controlled with a minimum expenditure.

Figure 4:
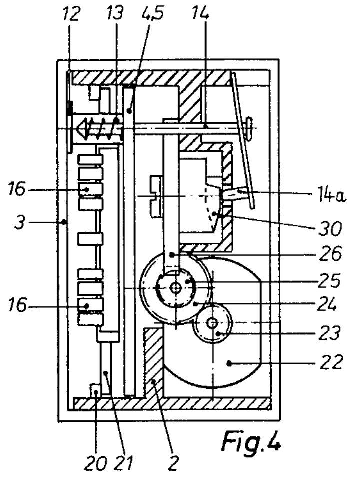
Figure 2:
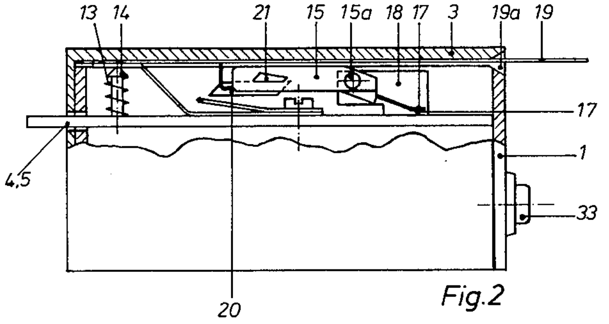
Figure 1:
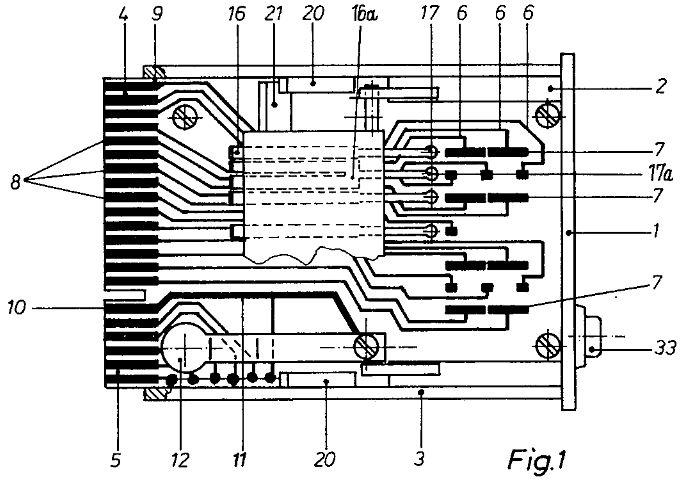

An embodiment of the electrically operated device in accordance with the invention for marking metal-coated paper is shown by way of example on the drawing, in which FIG. 1 is a top plan view showing the device from the marking side with the marking electrodes in inoperative position, FIG. 2 is a side elevation showing the sliding contacts and marking electrodes, FIG. 3 is a top plan view showing the device in its inoperative position as viewed from the driving side and FIG. 4 is a sectional view showing the marking device with drive means in inoperative position.

The electrically operated marking device which is shown is accommodated in a plastic carrying housing 1, which comprises an intermediate bottom 2 and a cover 3. As is apparent from FIG. 1, a printed circuit 4, 5 is secured to the intermediate bottom 2 and comprises conductor strips 6 and contact strips 7, which serve to apply the marking voltage and can be connected by plug contact strips 8 to an external circuit, not shown. The contact strips 7 are divided into a plurality of segments corresponding to the segments into which characters can be divided in known manner. Each contact strip 7 is connected by a separate conductor to an associated one of the plug contact strip 8, which are arranged at the edge of the printed circuit 4. The latter is accessible for a direct plug contact through an aperture 9.

The marking potential having the opposite polarity is applied to the metal coating of the electrosensitive paper via a plug contact strip 10, a conductor 11 and a large-area contact spring 12, which is lifted off in the inoperative position, shown in FIG. 4, and during the marking operation is biased by the compression spring 13 via the plunger 14.

As is apparent from FIG. 2, an electrode holder 15 is provided between the printed circuit 4,5 and the cover 3 and is provided with marking electrodes 16 and sliding contacts 17 and is slidably mounted in a longitudinal track 18. When the marking electrodes 16 are in inoperative position, the electrosensitive paper 19 is inserted along the cover 3 through the opening 19*a* of the housing 1.

It is apparent from FIG. 4 that the housing is provided on its inside surface with deflecting guides 20, which cooperate with the guides 21 of the electrode holder 15 and pivot the same about the pivotal axis 15*a* into engagement with the electrosensitive paper during a longitudinal displacement for a marking operation and lift off the electrode holder 15 during a return movement. As a result, the sliding contacts 17 are swung into contact with the contact strips 7 for the marking operation and are lifted off during the return movement.

The unilaterally angled marking electrode 16 consists of an inherently resilient sheet metal element consists of an inherently resilient sheet metal element and is provided on the contact side with a sliding contact 17. A separate sheet metal element is provided for each marking segment. These sheet metal elements are insulatedly embedded and held in the electrode holder 15.

For the marking operation, the sliding contacts 17 are moved over the contact strips 7 in unison with the longitudinal displacement of the electrode holder 15 so that the electrosensitive paper 19 is marked in dependence on the contact strips 7 to which marking voltage is applied. The width of the marking electrodes 16 will determine the width of the mark which is formed. It is also apparent from FIG. 1 that a segment may be subdivided if a split marking electrode 16*a* is provided with a common sliding contact 17*a*.

FIGS. 3 and 4 show an embodiment of a device which is operated by a motor 22, which by means of spur gears 23 and 24 and a worm 25 drives the worm wheel 26, which has a crankpin 27 connected by a connecting-rod 28 to a coupling pin 29, which is carried by the electrode holder 15. When the motor 22 is energized, the crankpin 27 revolves and during one revolution enforces the movement required for one marking operation. During that time the cam 30 cooperates with the follower pin 14*a* which is carried by a lever so that the spring-loaded plunger 14 is released during the marking operation and lifted off as the device returns to its position of rest. A cam 31 is formed on the worm wheel 26 and controls the motor 22 by means of the associated switch 32, until the latter opens to interrupt the motor circuit when the mechanism is in its inoperative position. This sequence is initiated in that a pushbuttom 33 which bridges the switch 32 is operated to close the motor circuit. The marking operation can also be initiated by remote control by means of a suitable signal supplied via a terminal which is not shown.

What is claimed is:

1. An electrically operated device for marking metal-coated paper, comprising a frame carrying a track, a voltage-applying circuit carried by said frame and comprising a plurality of contact segments, an electrode holder carried by said frame and in sliding contact with said track and movable relative to said circuit along said track between inoperative and operative positions, and a plurality of leaf springs carried by said electrode holder, each of said leaf springs comprising a sliding contact portion protruding from said electrode holder and arranged to be in sliding contact with an associated one of said contact segments when said electrode holder is in said operative position, each of said leaf springs also comprising a marking electrode portion protruding from said electrode holder and adapted to engage said metal-coated paper when said electrode holder is in said operative position and to be lifted from said paper when said electrode holder is in said inoperative position.

2. A marking device as set forth in claim 1, in which said contact segments are selectively energizable and said marking electrode portions constitute an array of marking electrode segments and are adapted to mark said paper with at least one selected multi-segment character in dependence on the energization of selected contact segments.

3. A marking device as set forth in claim 2, in which a separate supply conductor is connected to each of said contact segments.

4. A marking device as set forth in claim 2, in which said marking electrode portions are adapted to mark said paper with a plurality of selected multi-segment characters at the same time in dependense on the energization of selected contact segments.

5. A marking device as set forth in claim 2, in which said contact segments form a contact segment array and said array of marking electrode segments is larger than said contact segment array.

6. A marking device as set forth in claim 1, in which said leaf springs are angled.

7. A marking device as set forth in claim 1, in which said circuit is a printed on a circuit board.

8. A marking device as set forth in claim 1, in which said track is parallel to said circuit board.

9. A marking device as set forth in claim 8, in which said circuit board is disposed on one side of said electrode holder, and paper-holding means are provided for holding said paper parallel to said track on the opposite side of said electrode holders.

10. A marking device as set forth in claim 1, in which said marking electrode portions and said sliding contact protions are inherently resilient and adapted to be biased against said paper and said contact segments, respectively, when said electrode holder is in said operative position.

11. A marking device as set forth in claim 1, which comprises means for pivotally moving said marking electrode portions into engagement with said paper and for pivotally moving said sliding contacts into engagement with said contact segments in response to the movement of said electrode holder from said inoperative position to said operative position and for lifting said marking electrode portions from said paper and for lifting said sliding contacts from said contact segments in response to the movement of said electrode holder from said operative position toward said inoperative position.

12. A marking device as set forth in claim 1, in which said electrode holder is manually movable along said track and stop means are provided which are engageable with said electrode holder to define said inoperative and operative positions.

13. A marking device as set forth in claim 1, which comprises an electric motor a crank mechanism connecting said electric motor to said electrode holder, said electric motor being operable to move said electrode holder along said track by means of said crank mechanism, and control means for initiating the operation of said electric motor and for subsequently de-energizing said electric motor when said electrode holder is in said operative and inoperative positions.

14. A marking device as set forth in claim 1, which comprises means for applying a potential having a first polarity to said contact segments, a large-surface leaf spring arranged to resiliently bear on said marking electrode portions when said electrode holder is in said operative position, cam means for lifting said large-surface leaf spring from said marking electrode portions in response to the movement of said electrode holder from said operative position toward said inoperative positions, and P1 means for applying a potential having a second polarity to said large-surface leaf spring, said large-surface leaf spring being adapted to hold said paper against said marking electrode portions when said electrode holder is in said operative position.

* * * * *